United States Patent [19]

Spencer

[11] 4,229,867
[45] Oct. 28, 1980

[54] METHOD OF REPAIRING OR MODIFYING THE FIRING DECK OF AN INTERNAL COMBUSTION ENGINE

[75] Inventor: Boyd L. Spencer, Gladewater, Tex.

[73] Assignee: Spencer Heads, Inc., Gladewater, Tex.

[21] Appl. No.: 916,067

[22] Filed: Jun. 16, 1978

Related U.S. Application Data

[62] Division of Ser. No. 752,271, Dec. 20, 1976, Pat. No. 4,112,906.

[51] Int. Cl.³ .................. B23P 15/00; B23P 7/02
[52] U.S. Cl. .................. 29/156.4 R; 29/402.17; 29/402.06
[58] Field of Search .............. 29/156.4 R, 156.4 WL, 29/401 R, 401 D, 526; 123/193 CH, 193 H, 191 A, 26, 27, 32 SA, 32 JV, 32 AA, 75 B

[56] References Cited

U.S. PATENT DOCUMENTS

| 1,558,214 | 10/1925 | Archaouloff | 29/156.4 R |
|---|---|---|---|
| 2,234,780 | 3/1941 | Rippingille | 123/193 CH |
| 2,275,310 | 3/1942 | Nuttall | 29/156.4 WL |
| 2,868,181 | 1/1959 | Dolza | 123/32 JV |
| 3,081,754 | 3/1963 | Georges | 123/191 A |
| 3,694,838 | 10/1972 | Runton | 29/401 R |
| 3,750,259 | 8/1973 | Timmons | 29/401 R |
| 3,830,209 | 8/1974 | Jones, Jr. et al. | 123/193 H |
| 4,046,114 | 9/1977 | Hamparian et al. | 123/191 A |

FOREIGN PATENT DOCUMENTS

| 504513 | 8/1930 | Fed. Rep. of Germany | 123/191 A |
|---|---|---|---|
| 1197595 | 12/1959 | France | 123/27 |
| 488582 | 12/1953 | Italy | 123/156.4 R |
| 208218 | 12/1923 | United Kingdom | 123/191 A |
| 914497 | 1/1963 | United Kingdom | 123/191 A |

*Primary Examiner*—Daniel C. Crane
*Attorney, Agent, or Firm*—Imirie and Smiley

[57] ABSTRACT

An internal combustion engine including a coolant jacketed body surrounding a combustion cylinder with a tubular wall extending through the coolant jacket and surrounding an ignition device exposed through a firing deck area to said cylinder, has a circular recess axially of said ignition device and encompassing said firing deck area with an axially disposed, internally threaded bore extending from said recess into said tubular wall, and a circular plate insert having an axially disposed, externally threaded boss threadable into said bore to axially secure said insert within said recess, the diameter of said insert being less than the diameter of said recess to enable expansion by heat absorption of said insert independently of and without transmitting stress and strain to said engine body.

6 Claims, 6 Drawing Figures

METHOD OF REPAIRING OR MODIFYING THE FIRING DECK OF AN INTERNAL COMBUSTION ENGINE

This is a division of application Ser. No. 752,271, filed Dec. 20, 1976, now U.S. Pat. No. 4,112,906 granted Sept. 12, 1978.

BACKGROUND OF THE INVENTION

The firing deck in a cylinder of an internal combustion engine is subject to great stresses created by intensive variations in temperatures to which they are subjected during operation of the engines. These stresses frequently cause distortion and/or cracking of the firing deck so that a new head is required or the cracks in the used head must be sealed and machined for reuse.

To preclude and/or minimize the foregoing problems, U.S. Pat. No. 2,949,901 discloses an insert removably seated in a recess in the firing deck area of the engine body, with clearance between the periphery of the insert and the peripheral wall of the recess. The exposed wall of the insert constitutes the firing deck and is subjected to at least the greatest heat generated during operation of the engine, but the insert is free to expand due to the peripheral clearance without subjecting the material of the engine body to undue stress.

Although the firing deck area can be located in the peripheral wall of a cylinder in some engines, in the normal engine the firing deck is in the end wall of the cylinder that is constituted by the surface of the engine head that is engaged with the engine block containing the cylinder.

According to the foregoing patent, the insert is secured by bolts or the peripheral portion of the insert is sandwiched between the engine head and block. While these inserts have been highly successful in precluding cracking of heads and prolonging the operational life of engines, extensive operation of the engines have resulted in some problems.

As an example of problems that have occurred, expansion of the insert is inhibited to some degree by location of the bolts which necessarily are spaced from the axis of the insert. In addition, excessive vibration of the engine can cause loosening of the bolts or over-torquing of the bolts upon insertion can create excessive stress on the head. Moreover, if the insert is secured only by being sandwiched between the head and body, repeated expansion and contraction of the insert, plus the vibration during operation of the engine, can cause migration of the insert toward a point of the cylindrical wall of the recess within which the insert is seated.

BRIEF SUMMARY OF THE INVENTION

All engine bodies of the liquid cooled type are provided with an integral tube-like structure extending through the coolant jacket or chamber between the internal firing deck of the cylinder and an external surface of the body for the reception of an ignition device such as a sparkplug or a fuel injector unit for producing the explosion that drives the engine, the greatest heat being generated in the firing deck surrounding the ignition device and the ignition device usually being disposed axially or centrally of the firing deck or cylinder. According to the present invention, the body, usually the head, is provided with a cylindrical recess in the firing deck coaxial with the tube and also with an internally threaded bore extending from the inner surface of said recess coaxially with and extending into said tube structure.

The firing deck insert comprises a circular plate of a thickness substantially equal to the depth of said recess so that the firing deck surface of said insert is substantially coplanular with the engine body surface. The insert has a diameter sufficient to encompass the inlet and outlet ports but slightly less than that of the recess to provide peripheral clearance therebetween to accommodate expansion of said insert due to increase of temperature during operation of the engine. An axially disposed, externally threaded integral boss extends from the inner face of the insert and the insert and boss has an axially disposed bore therethrough for seating the inner end of the ignition device and exposing the latter to the combustion chamber.

The insert boss is threaded into the internally threaded bore in the engine body until the inner surface of the insert is firmly engaged with the floor of the firing deck recess of the body. To prevent possible loosening of the insert by threading due to vibration, expansion and contraction, the insert is provided with a radially disposed bore opening through its periphery and a dowel or dal pin is inserted through a bore through the body radially of the recess into the radial insert bore to secure the insert against rotation, but permit planar expansion.

DETAILED DESCRIPTION OF INVENTION

Figure 2:
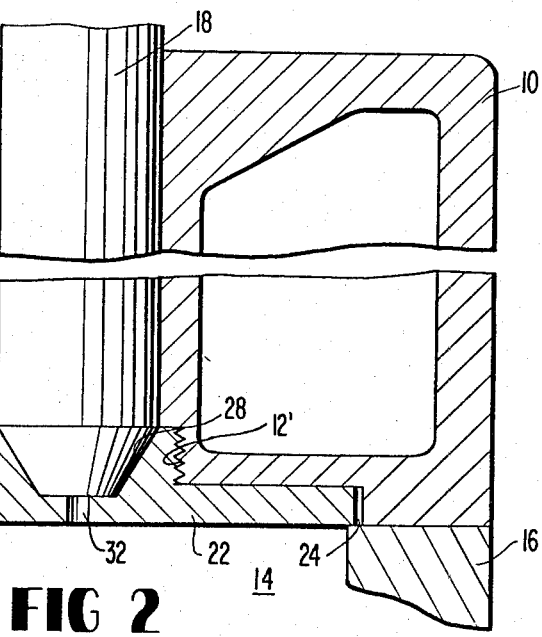
FIG. 2 is a cross-sectional view taken on line 2—2 of FIG. 1.

The head 10 of an engine, as better shown in FIG. 2, has a tubular structure 12 extending therethrough to the firing face axially of the combustion cylinder 14 of the block 16, the tube structure 12 defining a passageway between the cylinder 14 and the exterior of the engine and supporting an ignition divice 18 which, in this instance, is a fuel injector. The firing face of the head 10 is provided with a circular recess 20 for removably receiving a circular insert 22, there being peripheral clearance between the peripheral wall of the recess and the periphery of the insert to provide a gap 24 for accommodating expansion of the insert relative to the head to relieve the head of undue stress because of temperature variations, particularly excessive heat.

The head 10 has an internally threaded bore 12' disposed axially of the tube 12 and recess 20, said bore extending into the tube, and the insert 22 has an integral boss or collar 26 that is threaded externally to be secured in said bore 12' coaxially with the tube 12, said boss or collar 26 also having a seat 28 for the ignition device 18 which in this instance comprises a frusto-conical recess for seating the injector end of the fuel injector 18. Centrally securing the insert enables it to expand uniformly in all directions from the hottest point of the firing deck.

A dowel or dal pin 30 is inserted and threaded through a bore 31 in the head 10, said bore being disposed radially of the recess 20 and opening through the peripheral wall thereof, and said pin 30 being slidably fitted in a radially extending bore 31' opening through the periphery of the insert 22 to prevent rotation of the insert due to vibration. The shank of the pin 30 has a sliding fit with the bore 31' in the insert 22 to permit relative movement as the insert 22 expands and contracts. Alternatively, the pin 30 may be threaded into the insert and have a sliding fit with the bore 31 through the head, but in this case the free end of the pin should be recessed in the head bore to avoid possible extension of the head of the pin beyond the outer wall of the head when the insert is expanded.

Figure 1:
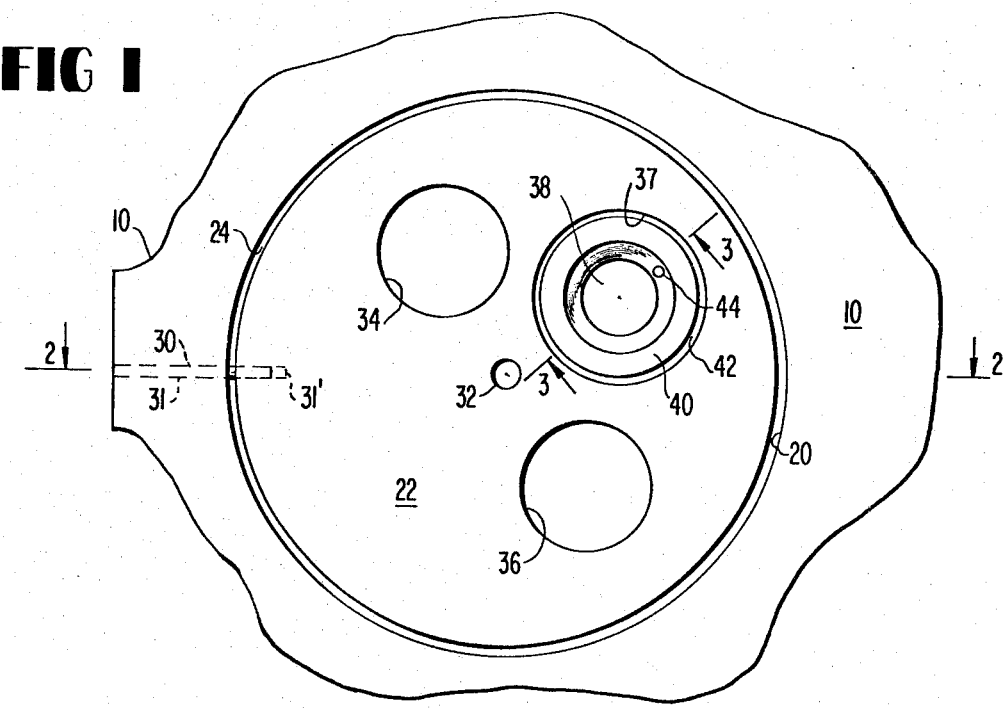
FIG. 1 is a plan view of the firing face or deck of an internal combustion engine of the fuel injector or diesel type.
Figure 3:
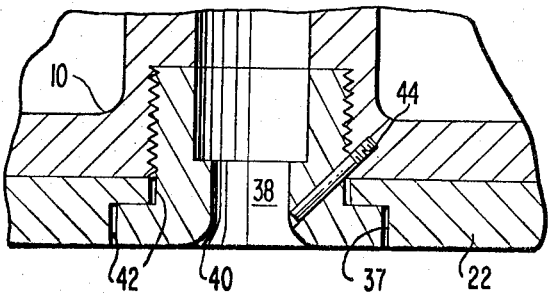
FIG. 3 is an enlarged fragmentary cross-sectional view taken on line 3—3 of FIG. 1.

The insert 22, as shown in FIG. 1, has a fuel inlet 32 aligned with the fuel injector 18, two valve openings 34 and 36 for alignment with the intake and exhaust passages and, as also shown in FIG. 3, an opening 37 that is aligned with a starter air inlet 38 that is surrounded by a bushing 40 that is inserted through the insert opening 37 with peripheral clearance defining a gap 42, and said bushing is fixed by a dowel 44 threaded into the head 10. The dowel 44 fixed the bushing 40 relative to the head 10 and prevents loosening due to vibration, while the gap 42 permits movement, due to expansion and contraction of the insert 22 relative to the head 10 and bushing 40.

Figure 4:
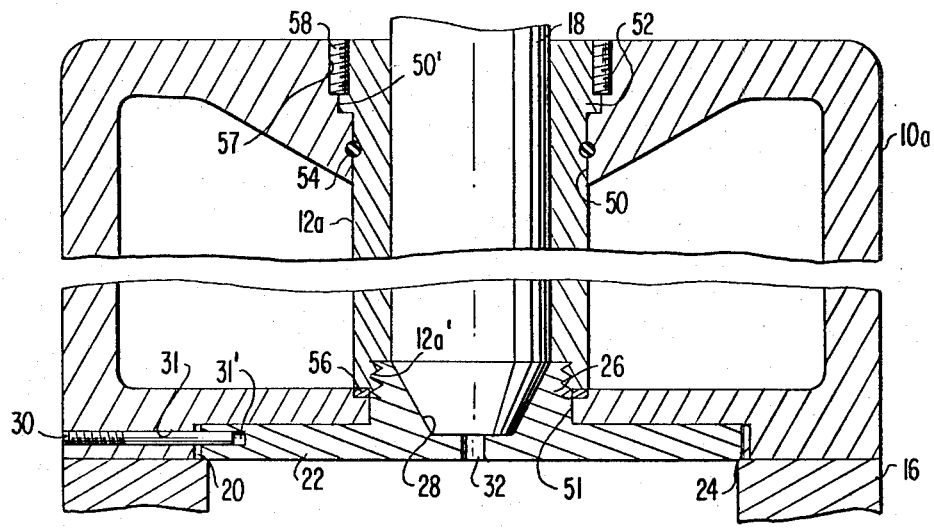
FIGS. 4, 5 and 6 are cross-sectional views similar to FIG. 2 but showing modifications.
Figure 5:
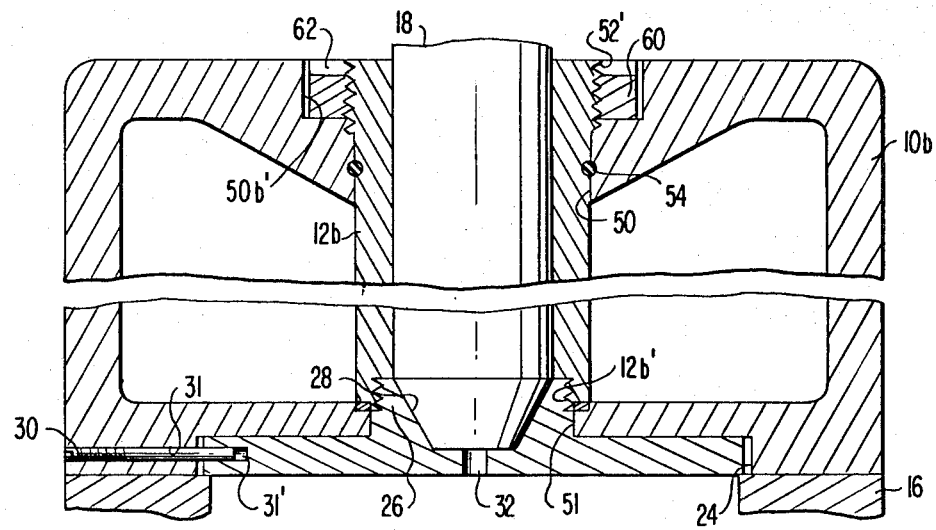

FIGS. 4 and 5 show heads that do not have an integral tube 12 or in which the original tube is of insufficient thickness to accommodate the threaded bore 12' without undue weakening of the tube wall at that point. This embodiment of the invention primarily is concerned with the repair of used heads and in this case a bore 50 is drilled through the upper walls and a bore 51 through the lower wall of the head to remove the original tube, and bore 50 being of sufficient diameter to receive a replacement tube 12a having walls of sufficient thickness to accommodate an internally threaded bore 12a' at its lower end for receiving the threaded boss 26 of the insert.

In FIG. 4, the tube 12a is inserted through the bore 50 through the top wall of a head 10a. The tube has a collar 52 around its upper end that is seated in a recess 50' surrounding the outer end of the bore 50, and has an internally threaded bore 12a' at its lower end for receiving the threaded collar or boss 26 on the insert 22. The tube is sealed relative to the head by an O-ring 54 surrounding its upper end and a gasket 56, preferably of copper, at its lower end and recessed in the inner wall of the head. One or more internally threaded bores 57 are drilled spanning the head 10a and collar 52 and set screws 58 are inserted between the collar 52 and the head into said bores 57 to prevent rotation of the tube. The set screw or screws 58 provide additional strength and preclude extreme over-torquing of the fuel injector.

FIG. 5 shows a modification of the FIG. 4 structure in that the tube 12b has an externally threaded collar 52' of reduced diameter at its upper end for cooperation with a ring nut 60 which may have a tool slot 62 or the like for threading the nut on the collar 52'. The head 10b has a recess 50b of increased diameter in its upper wall, and surrounding the tube receiving bore 50, to receive the nut 60. The tube 12b has an internally threaded bore 12b' in its lower end for receiving the boss 26 of the insert.

Figure 6:
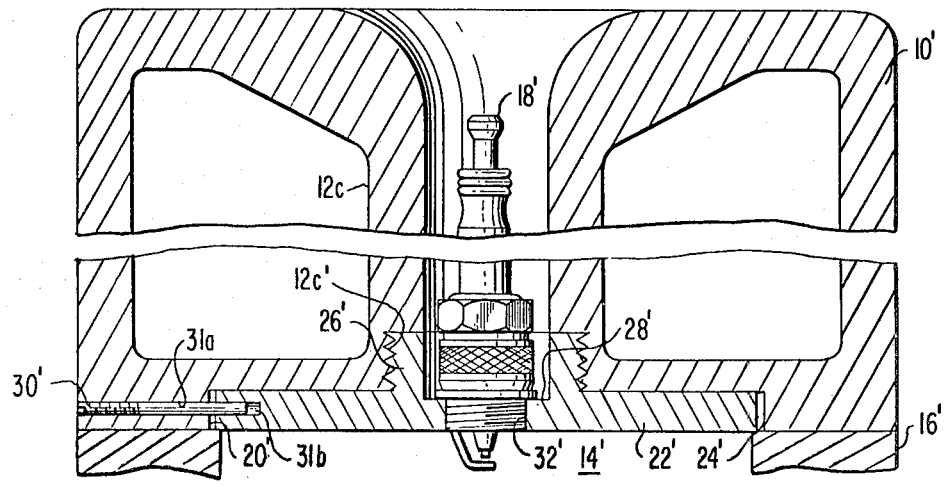

Although the foregoing modifications illustrate engines wherein the ignition device 18 is a fuel injection unit, the invention equally is applicable to engines that employ an ignition device of the spark plug type, as shown in FIG. 6. In this case, a head 10' comprises a tube structure 12c that freely receives the threaded boss 26' of an insert 22' that is nested in a recess 20' in the firing deck wall of the head with a peripheral clearance gap 24 therebetween. The seat 28' in the boss 26' is planar to accommodate the base end of the sparkplug 18' and the bore 32' is internally threaded to receive the threaded end of the plug and expose the spark-gap structure in the combustion cylinder 14' in the block 16'. A pin 30' is inserted through a bore 31a in the head 10' into a bore 31b in the insert.

The foregoing embodiments illustrate that the invention is applicable either to new engine bodies or heads in which event the recess 20 and bore 12' can be cast at the time that the body or head is cast and the recess and bore then machined to provide smooth surfaces for the recess and the internal threads in the bore. Alternatively, if the tube 12 is of sufficient diameter and wall thickness at the inner end thereof, a used head can be modified by machining out the recess 20 and then the bore 12'.

In heads or engine bodies in which the tube 12 is not of sufficient diameter of the wall thickness at the point of the bore 12' is insufficient to accommodate the bore, then the head or body may be machined completely through to provide the bores 50–51 and a new tube 12a, 12b inserted therein as shown in FIGS. 4 and 5. Also, in such heads usually the recess 20 and bore 12' must be machined into the firing deck wall of the body or head.

In the vast majority of instances, at the present time, the invention is applied to used heads which have been cracked in the firing deck surface due to the terrific stresses imposed by temperature variations and normally these cracks will appear between the point of ignition and the exhaust passage. In applying the invention to this type of used head, the crack is usually sealed in a normal manner and the firing deck surface is machined to provide the recess 20 and the bore 12', the internal threads being cut into the bore at the time of machining.

Preferably, the insert 22 is of such a diameter as to completely span the combustion cylinder 14 and overlap the edges thereof so that the edge portions of the insert is sandwiched between the body and the bottom of the recess. Having determined the diameter of insert that is necessary, the recess 20 then is machined to provide it with a diameter that will permit a peripheral clearance 24 between the periphery of the insert and the peripheral wall of the recess. The insert 22 then is threaded into place with the proper degree of torque so that it is firmly seated but not subjected to strain producing over-torquing.

When the insert is threaded into the engine body recess with the required tightness but without over-torquing, the bore 31 is drilled and internally threaded through the engine body and drilling also proceeds into the periphery of the insert to provide the bore 31', which bores jointly receive the pin 30. The pin 30 retains the insert 22 against unthreading or tightening due to vibrations and temperature variations in the insert and retains the insert in proper position during further operations.

When the insert is properly seated and anchored, it then is properly marked to locate the centers of the inlet and exhaust openings 34 and 36. This can be accomplished in various ways but most conveniently the centers for the openings are determined by insertion of a marking tool, such as a small diameter drill, through the valve guides in the engine body. A drill of the proper diameter for the openings 34 and 36 then can be aligned with the marked centers for drilling the openings. The center for the opening 37 for the compress air inlet 38, if such is necessary, can be determined by measurement with respect to the valve openings, the ignition opening 5 or other physical features. After the insert is properly seated and completely finished, including the sealing of the bushing 40 if required, the firing deck surface of the insert and contiguous surface of the engine body or head are machined to be co-planar.

It has been found that the intense heat to which the insert is subject causes the insert to expand radially in all directions from its boss 26, there being no restrictions in such radial expansion even if the engine is of the type to have a compressed air inlet because of the clearance provided by the gaps 42 around the boss 40 surrounding the inlet, the gaps 42 permitting expansion and resultant movement of the insert relative to both the engine body and the bushing 40. While some of the heat absorbed by the insert is transferred through the firing deck wall of the engine body, the reduced thickness of such wall is maintained in a relatively cool condition by the coolant that flows through the water jacket and is in constant engagement with such wall. Moreover, the engine so modified produces greater horsepower because the insert retains the heat and causes more complete combustion.

What is claimed is:

1. A method of repairing or modifying an internal combustion engine having a coolant jacketed engine body including at least one combustion chamber having a firing deck surface with a critical area surrounding an ignition device being sealed from the coolant jacket by a generally tubular shaped wall structure, comprising providing said firing deck area with a recess encompassing the area subject to the greatest strain during operation, said recess being disposed axially of the ignition device and including a floor spaced inwardly from said firing deck and surrounded by a peripheral wall extending between said floor and said deck, drilling an axially disposed internally threaded bore extending into the tubular wall structure from the floor surface of said recess, providing an insert comprising a circular body of a thickness substantially corresponding to the depth of said recess and having an inner surface surrounded by a peripheral edge and an outer firing wall substantially corresponding to the configuration of said firing deck surface and nesting said insert in said recess to conform to the recess with peripheral clearance and to cover at least a portion of the critical area of the firing deck surface, the diameter of said insert being slightly smaller than that of the recess with the peripheral edge of said insert spaced from the peripheral wall of the recess and providing the peripheral clearance as an expansion area for said insert to accommodate absorption by said insert of heat and strain independently of the engine body, and comprising a centrally disposed externally threaded boss of reduced diameter extending axially from the inner surface of said insert body and threadable into the internally threaded bore in said engine body for securing the insert and body together, and inserting said insert boss said internally threaded bore and rotating said insert to thread said boss into said bore until the inner surface of said insert body firmly engages the floor of said recess to transmit heat therebetween, the thickness of said insert being substantially equal to the depth of said recess with the exposed surface of said insert generally contiguous with and conforming to said engine body surface surrounding said recess, said boss having an axially disposed opening therethrough and including a portion defining a set for said ignition device and an opening for exposing said ignition device to said combustion chamber, whereby said insert body is centrally fixed by said boss relative to the point of combustion in said chamber but is free to expand radially from said boss as it absorbs heat of combustion without stress or strain, and further providing an insert that can expand radially as a result of heat absorption in said recess without restrictions in such radial expansion, said boss serving as the only means for fixedly attaching said insert body in said chamber.

2. A method of repairing or modifying an internal combustion engine according to claim 1 and further comprising drilling a bore through the engine body from the exterior thereof to the circumferential recess wall and drilling a bore into the periphery of said insert so as to be coaxial with said engine body bore when said insert has been inserted, both said bores being drilled radially of said recess and said insert, and inserting a dowel pin into said bores to secure said insert against rotational movement such that said dowel is fixed in only one of said two bores and is slidably received by the other of said two bores so that said insert is free to expand and contract radially with respect to said engine body.

3. A method of repairing or modifying an internal combustion engine according to claim 1 wherein said insert providing step further comprises providing an insert that is substantially disk-shaped having substantially coplanar top and bottom surfaces and said recess providing step further comprises providing said recess with a floor surface that is substantially planar so that there is contact between substantially all of said recess floor surface and the abutting surface of said insert for maximum heat transfer therebetween and so that there can be radial sliding contact therebetween as said insert expands and contracts.

4. A method of repairing or modifying an internal combustion engine having a coolant jacketed engine body including at least one combustion chamber having a firing deck surface with a critical area surrounding an ignition device and subject to thermal stresses, the ignition device being sealed from the coolant jacket by a generally tubular shaped wall structure, comprising providing said firing deck area with a recess encompassing the area subject to the greatest strain during operation, said recess being disposed axially of the ignition device, and drilling an axially disposed internally threaded bore extending into the tubular wall structure from the bottom surface of said recess, providing an insert comprising a circular body to be nested in and to conform to the recess with peripheral clearance and to cover at least a portion of the critical area of the firing deck surface, the diameter of said insert being sightly smaller than that of the recess with the peripheral edge of said insert spaced from the peripheral wall of the recess and providing the peripheral clearance as an expansion area for said insert to accommodate absorption by said insert of heat and strain independently of the engine body, and a centrally disposed externally threaded boss of reduced diameter extending axially from the inner surface of said insert body and threadable into the internally threaded bore in said engine body for securing the insert and body together, inserting said insert boss into said internally threaded bore and rotating said insert to thread said boss into said bore until the inner surface of said insert body firmly engages the floor of said recess, the thickness of said insert being substantially equal to the depth of said recess with the exposed surface of said insert generally contiguous with and conforming to said engine body surface surrounding said recess, said boss having an axially disposed opening therethrough and including a portion defining a set for said ignition device and an opening for exposing said ignition device to said combustion chamber, whereby said insert body is centrally fixed by said boss relative to the point of combustion in said chamber but is free to expand radially from said boss as it absorbs heat of combustion without stress or strain, drilling a bore through the enging body from the exterior thereof to the circumferential recess wall and into the periphery of said insert radially of said recess and insert, and inserting a dowell pin into said bores to secure said insert against rotational movement, said engine body having inlet and exhaust passageways therethrough and opening into the area encompassed by said recess, determining and marking the location of the centers of said inlet and exhaust openings on said insert, and drilling holes through said insert in alignment with said holes, machining the exposed firing deck surface of said insert and the surrounding contiguous area of said engine body to be substantially co-planar, said engine body having compressed air inlet opening into said combustion chamber within the area of said recess, drilling a bore through said insert in axial alignment with said compressed air inlet, counterboring said air pressure bore through said insert to provide a flange portion adjacent the base wall of said recess, and inserting a bushing having an outer radial flange overlying said insert flange through said latter bore and into said air inlet with peripheral clearance between both said air pressure bore and counterbored portion and said bushing.

5. A method of repairing or modifying an internal combustion engine according to claim 4 comprising drilling an internally threaded blind bore through said bushing and into the engine body inwardly of said recess, and threading a bolt into said bore to prevent displacement of said bushing.

6. A method of repairing or modifying an internal combustion engine according to claim 5 comprising machining the exposed firing deck surfaces of said insert and bushing and the surrounding contiguous area of said engine body to be co-planar.

* * * * *